(12) United States Patent
Soled et al.

(10) Patent No.: US 6,299,760 B1
(45) Date of Patent: Oct. 9, 2001

(54) NICKEL MOLYBODTUNGSTATE HYDROTREATING CATALYSTS (LAW444)

(75) Inventors: Stuart L Soled; Sabato Miseo, both of Pittstown; Roman Krycak, Annandale; Hilda Vroman, Piscataway; Teh C. Ho, Bridgewater, all of NJ (US); Kenneth L. Riley, Baton Rouge, LA (US)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/518,741

(22) Filed: Mar. 3, 2000

Related U.S. Application Data

(62) Division of application No. 08/900,389, filed on Aug. 12, 1999, now Pat. No. 6,156,695.

(51) Int. Cl.$^7$ .................................................. C10G 17/00
(52) U.S. Cl. .................................. 208/254 H; 208/254 R
(58) Field of Search .......................... 228/254 H, 254 R, 228/251 H

(56) References Cited

U.S. PATENT DOCUMENTS 4,824,821 * 4/1989 Lopez et al. ......................... 502/200
4,857,496 * 8/1989 Lopez et al. ......................... 502/220

FOREIGN PATENT DOCUMENTS

2030444 * 3/1995 (RU) .............................. C10G/45/08

OTHER PUBLICATIONS

Levin, D., Soled, S.L., and Ying, J.Y., Crytsal Structure of an Ammonium Nickel Molybdate prepared by Chemical Precipitation, Inorganic Chemistry, vol. 35, No. 14, pp. 4191–4197 (Sep. 1995).*

Teichner and Astier, Appl. Catal. 72, 321–29 and C, R, Acad, Sci, 304 (II), #11, 563–6 (1987) Sep. 1990.*

Mazzocchi, Solid State Ionics, 63–65 (1993) 731–35. Month N/A.*

* cited by examiner

Primary Examiner—Helane E. Myers
(74) Attorney, Agent, or Firm—Paul E. Purwin

(57) ABSTRACT

A hydrodenitrogenation catalyst is prepared by decomposing a nickel (ammonium) molybdotungstate precursor and sulfiding, either pre-use or in situ, the decomposition product.

5 Claims, 2 Drawing Sheets

NICKEL MOLYBODTUNGSTATE HYDROTREATING CATALYSTS (LAW444)

This is a divisional of U.S. Ser. No. 08/900,389 filed Aug. 12, 1999 now U.S. Pat. No. 6,156,695.

FIELD OF THE INVENTION

This invention relates to new hydrodenitrogenation (HDN) catalysts. More particularly this invention relates to the decomposition product of nickel (ammonium) molybdotungstates and their use as catalysts in HDN processes.

BACKGROUND OF THE INVENTION

As the supply of low sulfur, low nitrogen crudes decrease, refineries are processing crudes with greater sulfur and nitrogen contents at the same time that environmental regulations are mandating lower levels of these heteroatoms in products. Consequently, a need exists for increasingly efficient desulfurization and denitrogenation catalysts.

In one approach, a family of compounds, related to hydrotalcites, e.g., ammonium nickel molybdates, has been prepared. Whereas X-ray diffraction analysis has shown that hydrotalcites are composed of layered phases with positively charged sheets and exchangeable anions located in the galleries between the sheets, the related ammonium nickel molybdate phase has molybdate anions in interlayer galleries bonded to nickel oxyhydroxide sheets. See, for example, Levin, D., Soled, S. L., and Ying, J. Y., Crystal Structure of an Ammonium Nickel Molybdate prepared by Chemical Precipitation, Inorganic Chemistry, Vol. 35, No. 14, p. 4191–4197 (1996). The preparation of such materials also has been reported by Teichner and Astier, Appl. Catal. 72, 321–29 (1991); Ann. Chim. Fr. 12, 337–43 (1987), and C. R. Acad. Sci. 304 (II), #11, 563–6 (1987) and Mazzocchia, Solid State Ionics, 63–65 (1993) 731–35.

Now, when molybdenum is partially substituted for by tungsten, an amorphous phase is produced which upon decomposition and, preferably, sulfidation, provides enhanced hydrodenitrogenation (HDN) catalyst activity relative to the unsubstituted (Ni—Mo) phase.

SUMMARY OF THE INVENTION

In accordance with this invention, an amorphous nickel molybdo tungstate composition is produced and exhibits enhanced hydrodenitrogenation (HDN) activity as compared to known catalyst. In essence, at least a portion but not all of the molybdenum in a nickel-molybdate system is replaced by tungsten, that is the molar ratio of molybdenum to tungsten is at least 0.01/1 and less than 0.95/1.

The composition can be further described as a bulk mixed metal oxide useful as an HDN catalyst and preferably sulfided prior to use as a catalyst, of the formula:

$$(Ni)_b(Mo)_c(W)_dO_z$$

wherein the molar ratio of b: (c+d) is 0.5/1 to 3/1, preferably 0.75/1 to 1.5/1, more preferably 0.75/1 to 1.25/1;

The molar ratio of c:d is preferably >0.01/1, more preferably >0.1/1, still more preferably 1/10 to 10/1, still more preferably 1/3 to 3/1, most preferably substantially equimolar amounts of Mo and W, e.g., 2/3 to 3/2; and z=[2b+6(c+d)]/2.

The essentially amorphous material has a unique X-ray diffraction pattern showing crystalline peaks at d=2.53 Angstroms and d=1.70 Angstroms.

The mixed metal oxide is readily produced by the decomposition of a precursor having the formula:

$$(NH_4)_a(Ni)_b(Mo)_c(W)_dO_z$$

wherein the molar ratio of a:b is ≦1.0/1, preferably 0–1; and b, c, and d, are as defined above, and z=[a+2b+6(c+d)]/2. The precursor has similar peaks at d=2.53 and 1.70 Angstroms.

Decomposition of the precursor may be effected at elevated temperatures, e.g., temperatures of at least about 300° C., preferably about 300–450° C., in a suitable atmosphere, e.g., inerts such as nitrogen, argon, or steam, until decomposition is substantially complete, i.e., the ammonium is substantially completely driven off. Substantially complete decomposition can be readily established by thermogravimetric analysis (TGA), i.e., flattening of the weight change curve.

PREFERRED EMBODIMENTS

Figure 1:
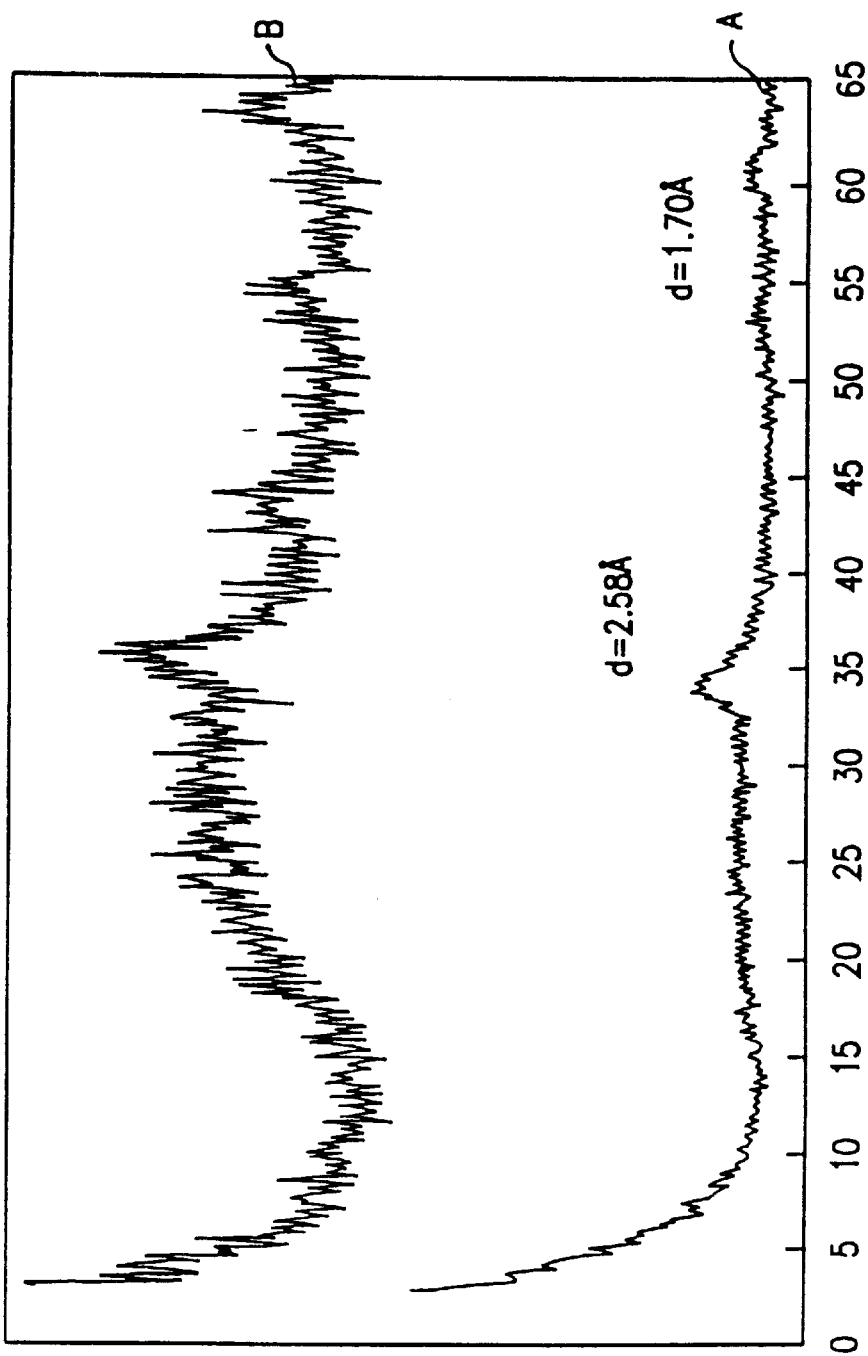
FIG. 1 is the X-ray diffraction pattern of a NH$_4$—Ni-0.5Mo-0.5W—O compound prepared by boiling precipitation before calcining (Curve A) and after calcining at 400° C. (Curve B). Note that the patterns for both the precursor and the decomposition product of the precursor are quite similar with the two peaks at essentially the same place. The ordinate is relative intensity; the abscissa is two theta (degrees).

The precursor compound can be readily prepared by one of several methods, including a variation of the boiling decomposition method used by Teichner and Astier in which a tungsten compound is added to the initial mixture of a molybdenum salt, a nickel salt and ammonium hydroxide. Direct precipitation and pH controlled precipitation may also be used to prepare the precursor compound. In all cases, however, water soluble salts of nickel, molybdenum and tungsten are employed.

Preferably, the molybdenum and tungsten salts are ammonium compounds, e.g., ammonium molybdate, ammonium metatungstate, while the nickel salt may be the nitrate or hydrated nitrates.

In the boiling decomposition method, the salts are dissolved in water to make an acidic solution, after which additional NH$_4$OH is added to make a basic solution. The solution is then heated to boiling to drive off ammonia and form a precipitate which is filtered and dried, e.g. at 100–125° C.

In the direct precipitation method, initially the molybdate and tungstate salts are dissolved in water, NH$_4$OH is added to form a basic solution, and the solution is warmed. A warm, e.g., 90° C., nickel salt solution (aqueous) is slowly added to the initial solution, a precipitate is formed, the solution is hot filtered and dried. In either the boiling decomposition method or the direct precipitation method, washing of the filtrate is minimized to prevent leaching.

In general, all of the components, the Ni, Mo, W, NH$_3$, are mixed in solution together and heated to a pH <7 to form the precipitate, i.e., the precursor compound. This may be accomplished by either of two methods: (1): adding all of the components together with an excess of ammonia to dissolve the components and then heating to drive off the ammonia such that the pH <7 (heating may be at less than 100° C., preferably about 50–90° C.); or (2) adding together one or more separate solutions of each component such that the final pH is <7; in each case recovering the resulting precipitate.

In another embodiment, a binder can be added to the bulk mixed metal oxide to maintain particle integrity. The binder can be silica, alumina, silica-alumina or other materials generally known as particle binders. When utilizing a binder, the amount may range from about 1–30 wt % of the finished catalyst, preferably about 5–26 wt % of the finished catalyst.

After recovering the precursor product, regardless of preparation method, the precursor is decomposed at temperatures ranging from about 300–450° C. in a suitably inert or air atmosphere.

The decomposed precursor can be sulfided or pre-sulfided by a variety of known methods. For example, the decomposition product can be contacted with a gas comprising $H_2S$ and hydrogen, e.g., 10% $H_2S/H_2$, at elevated temperatures for a period of time sufficient to sulfide the decomposition product, usually at the point of $H_2S$ breakthrough in the exit gas. Sulfiding can also be effected, in situ, by passing a typical feedstock containing sulfur over the decomposition product.

Any hydrocarbon containing feed which also contains nitrogen may be treated with the enhanced catalysts of this invention. Thus, the HDN process with these catalysts may range from petroleum distillates to residual stocks, either virgin or cracked, to synthetic fuels such as coal oils or shale oils. The HDN process is particularly useful with feeds containing high levels of nitrogen, e.g., at least about 500 ppm total nitrogen compounds. Nitrogen removal is at least about 50%, preferably at least about 80%.

Process conditions applicable for the use of the catalysts described herein may vary widely depending on the feedstock to be treated. Thus, as the boiling point of the feed increases, the severity of the conditions will also increase. The following table serves to illustrate typical conditions for a range of feeds.

pH equaled 4.3. To this solution, a concentrated $NH_4OH$ solution was added. At first, a precipitate formed which on further addition of $NH_4OH$ dissolved to give a clear blue solution with a pH of 8.3, and additional $NH_4OH$ (~250 cc) was added until a pH of 10 was reached. The solution was heated to 90° C. for 3 h during which ammonia gas evolved and a green precipitate formed. The final pH lay between 6.8 and 7. The suspension was cooled to room temperature, filtered, washed with water and dried at 120° C. overnight. About 18.6 g of material was obtained. The sample analyzed for Ni at 26.6 wt % and Mo at 34 wt %. The X-ray diffraction spectra of the phase matches the pattern reported by Teichner.

EXAMPLE 2

Figure 2:
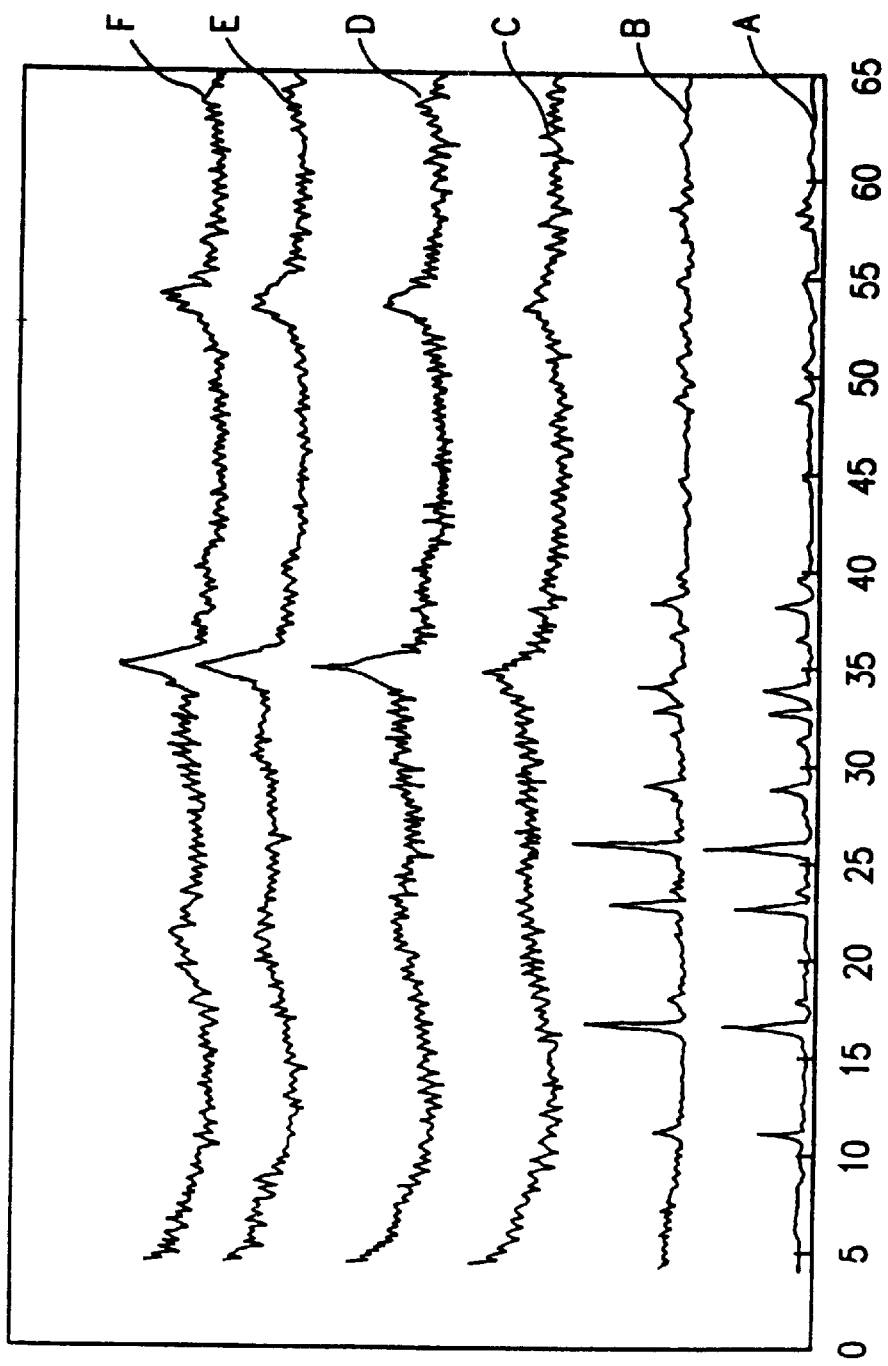
FIG. 2 shows the X-ray diffraction patterns, by CuKα radiation (λ=1.5405 Å), of NH$_4$—Ni—Mo$_{1-x}$—W$_x$—O precursors wherein curve A is Mo$_{0.9}$W$_{0.1}$, curve B is Mo$_{0.7}$W$_{0.3}$, curve C is Mo$_{0.5}$W$_{0.5}$, curve D is Mo$_{0.3}$W$_{0.7}$, curve E is Mo$_{0.1}$W$_{0.9}$, and curve F is Mo$_0$W$_1$. The ordinate and abscissa are as described for FIG. 1.

Preparation of $NH_4$—Ni—$Mo_{.5}W_{0.5}$—O by boiling decomposition:

In a 1 liter flask, 13.2 g ammonium molybdate (0.075 moles Mo), 18.7 g ammonium metatungstate (0.075 moles W) and 43.6 g nickel nitrate hexahydrate (0.15 moles Ni) were dissolved in 300 cc of water so that the resulting pH equaled 4.3. To this solution, a concentrated $NH_4OH$ solution (~600 cc) was added until the pH reached 10. At this point, some precipitate remained. The solution was refluxed at 100° C. for 3 h. During this heating, the precipitate dissolved to give a clear blue solution and on further heating, a green precipitate formed. The heating was continued until the pH reached between 6.8 and 7. The suspension was cooled to room temperature, filtered, washed with water and dried at 120° C. overnight. 18 grams of material is obtained. The X-ray diffraction spectra of the phase is given in FIG. 2 showing an amorphous background with the two largest peaks at d=2.58 and 1.70 Å.

EXAMPLE 3

Preparation of $NH_4$—Ni—$Mo_{0.5}W_{0.5}$—O by direct precipitation:

In a 1 liter flask, 17.65 g of ammonium molybdate (0.1 mole Mo) and 24.60 g of ammonium metatungstate (0.1 mole W) were dissolved in 800 cc of water giving a solution pH of 5.2. To this solution 0.4 moles of $NH_4OH$ (~30 cc)

| FEED | TYPICAL BOILING RANGE ° C. | TEMP. ° C. | PRESS, BAR | SPACE VELOCITY V/V/HR | $H_2$ GAS RATE SCF/B |
|---|---|---|---|---|---|
| naphtha | 25–210 | 100–370 | 10–60 | 0.5–10 | 100–2,000 |
| diesel | 170–350 | 200–400 | 15–110 | 0.5–4 | 500–6,000 |
| heavy gas oil | 325–475 | 260–430 | 15–170 | 0.3–2 | 1000–6,000 |
| lube oil | 290–550 | 200–450 | 6–210 | 0.2–5 | 100–10,000 |
| residuum | 10–50% > 575 | 340–450 | 65–1100 | 0.1–1 | 2,000–10,000 |

While the invention described herein shows enhanced activity for hydrodenitrogenation, most HDN catalysts will also show hydrodesulfurization (HDS) activity. Consequently, the catalysts and processes described herein will be useful on feeds containing both nitrogen and sulfur, and will be particularly useful on feeds high in nitrogen.

The following examples will serve to illustrate, but not limit, this invention.

EXAMPLE 1

Preparation of $NH_4$—Ni—Mo—O Phase (boiling decomposition as per Teichner and Astier procedure):

In a 1 liter flask, 26.5 g ammonium molybdate (0.15 moles Mo) and 43.6 g nickel nitrate hexahydrate (0.15 moles Ni) were dissolved in 300 cc of water so that the resulting was added, raising the pH to ~9.8 (solution A). This solution was warmed to 90° C. A second solution was prepared by adding 58.2 g of nickel nitrate, (0.2 moles Ni) which was dissolved in 50 cc of water (solution B) and maintained at 90° C. This solution was added dropwise at a rate of 7 cc/min into the ammonium molybdate/ammonium metatungstate solution. A precipitate begins to form after ¼ of the solution was added. This suspension which was at a pH ~6.5 was stirred for 30 minutes while the temperature was maintained at 90° C. The material was filtered hot, washed with hot water, and dried at 120° C. Approximately 38 g of material was recovered.

EXAMPLE 4

Preparation of $NH_4$—Ni—$Mo_{0.5}$—$Mo_{0.5}W_{0.5}$—O by controlled pH precipitation:

Two solutions were prepared with the same amounts of nickel, tungsten, molybdenum and ammonium hydroxide are described in Example 3 (solutions A and B) except that each solution contained about 700 cc of water. The two solutions were added into a separate vessel initially containing 400 cc of water held at 90° C. Solution B (the acidic solution) was pumped into the vessel at a constant rate of ~15 cc/min, while solution A is added through a separate pump which is under feedback PC control and set to maintain the pH at 6.5. On mixing the two solutions a precipitate forms. The slurry was stirred at 90° C. for 30 minutes, filtered hot, washed with hot water, and dried at 120° C.

EXAMPLE 5
Catalytic Evaluation Using Dibenzothiophene (DBT):

1.5–2 g of the catalysts of Examples 1–4 were placed in a quartz boat which was in turn inserted into a horizontal quartz tube and placed into a Lindberg furnace. The temperature was raised to 370° C. in about one hour with $N_2$ flowing at 50 cc/m, and the flow continued for 1.5 h at 370° C. $N_2$ was switched off and 10% $H_2S/H_2$ then added to the reactor at 20 cc/m, the temperature increased to 400° C., and held there for 2 hours. The heat was then shut off and the catalyst cooled in flowing $H_2S/H_2$ to 70° C., at which point this flow was discontinued and $N_2$ was added. At room temperature, the quartz tube was removed and the material transferred into a $N_2$ purged glove box. Catalysts were evaluated in a 300 cc modified Carberry batch reactor designed for constant hydrogen flow. The catalyst was pilled and sized to 20/40 mesh and one gram was loaded into a stainless steel basket, sandwiched between a layer of mullite beads. 100 cc of liquid feed, containing 5 wt % dibenzothiophene in decalin was added to the autoclave. A hydrogen flow of 100 cc/min was passed through the reactor and the pressure was maintained at 3150 kPa using a back pressure regulator. The temperature was raised to 350° C. at 5–6 deg/min and run until either 50% DBT was converted or until 7 hours was reached. A small aliquot of product was removed every 30 minutes and analyzed by GC. Rate constants for the overall conversion as well as the conversion to the reaction products biphenyl (BP) and cyclohexylbenzene (CHB) were calculated as described by M. Daage and R. R. Chianelli [J. Cat. 149, 414–27 (1994)] and are shown in Table 1. As described in that article, high selectivities to cyclobexylbenzene relative to BP during the desulfurization reaction are a good indication of a catalyst with high hydrodenitrogenation activity, whereas high selectivities of BP relative to CHB indicates a catalyst with high hydrodesulfurization activity.

The results show that partial substitution of tungsten for molybdenum results in catalysts that are substantially higher for DBT conversion. A standard supported Ni—Mo on $Al_2O_3$ catalyst is also shown for comparison. The high CHB/BP ratio suggests that the catalysts are active for HDN.

TABLE 1

Comparison of Activity in DBT Conversion Tests With Tungsten Addition by Different Preparation Schemes

| catalyst | preparation technique | example # | $K_{total}$ @ 350° C. | CHB/BP @ 350° C. |
|---|---|---|---|---|
| $NH_4$—Ni—Mo—O | boiling decomposition | 1 | 106 | 10.4 |
| $NH_4$—Ni—$Mo_{.5}W_{.5}$—O | boiling decomposition | 2 | 171 | 10.2 |
| $NH_4$—Ni—$Mo_{.5}W_{.5}$—O | direct precipitation | 3 | 167 | 12.4 |
| $NH_4$—Ni—$Mo_{.5}W_{.5}$—O | controlled pH preparation | 4 | 181 | 12.0 |
| Ni, Mo/$Al_2O_3$ | impregnation | | 129 | 6.4 |

EXAMPLE 6

A series of catalysts were prepared in accordance with the general preparation scheme of example 2 (i.e., boiling decomposition) but varying the Mo and W relative ratios by changing the amount of ammonium molybdate and ammonium metatungstate added to the solutions. Decomposition was effected as described in Example 5. The catalysts so prepared are shown in Table 2 along with their catalytic activities for DBT measured as described in Example 5.

TABLE 2

Comparison of Activity in DBT Conversion Tests with Variation in Relative W and Mo content

| Catalyst | Sample | ammonium molybdate (g) | ammonium metatungstate (g) | nickel nitrate hexahydrate (g) | $K_{total}$ @ 350° C. | CHB/BP @ 350° C. |
|---|---|---|---|---|---|---|
| $NH_4$—NiW—O | 18983-97 | 0 | 36.95 | 43.62 | 128 | 11.3 |
| $NH_4$—$NiMo_{.1}W_{.9}$—O | 18983-125 | 2.65 | 33.62 | 43.62 | 132 | 14.1 |
| $NH_4$—$NiMo_{.3}W_{.7}$—O | 18983-101 | 7.94 | 25.87 | 43.62 | 154 | 11.6 |
| $NH_4$—$NiMo_{.5}W_{.5}$—O | 18357-109 | 13.17 | 18.74 | 43.62 | 171 | 10.2 |
| $NH_4$—$NiMo_{.7}W_{.3}$—O | 18983-95 | 18.54 | 11.09 | 43.62 | 158 | 11.5 |
| $NH_4$—$NiMo_{.9}W_{.1}$—O | 18983-92 | 23.83 | 3.69 | 43.62 | 141 | 10.5 |

The data show that the most active catalyst contains an approximately equimolar mixture of tungsten and molybdenum.

EXAMPLE 7

A series of catalysts were prepared as described in Example 3 (direct precipitation) in which equimolar mixtures of Mo and W were precipitated but the nickel content was varied. Decomposition was effected as described in Example 5. The catalysts so prepared are shown in Table 3 along with their catalytic activities for DBT measured as described in example 5.

TABLE 3

Variation of Nickel Content in $NH_4$—Ni—$Mo_{.5}W_{.5}$—O Catalysts

| Catalyst | Sample | ammonium molybdate (g) | ammonium metatungstate (g) | nickel nitrate hexahydrate (g) | $K_{total}$ @ 350° C. | CHB/BP @ 350° C. |
|---|---|---|---|---|---|---|
| $NH_4$—$Ni_{0.75}Mo_{.5}W_{.5}$—O | 19086-110 | 17.65 | 24.6 | 43.65 | 171 | 13.0 |
| $NH_4$—$Ni_{1.0}Mo_{.5}W_{.5}$—O | 19086-82 | 17.65 | 24.6 | 58.2 | 167 | 12.4 |
| $NH_4$—$Ni_{1.25}Mo_{.5}W_{.5}$—O | 19086-111 | 17.65 | 24.6 | 72.75 | 174 | 11.0 |
| $NH_4$—$Ni_{1.5}Mo_{.5}W_{.5}$—O | 19086-112 | 17.65 | 24.6 | 87.3 | 148 | 9.55 |

Catalytic performance does not change substantially with variations in Ni from 0.75 to 1.5, although K appears to go through a maximum at about 1.25 Ni.

EXAMPLE 8

A series of catalysts were prepared in which the quantity of $NH_4OH$ used in the preparation was varied. The catalysts were prepared in accordance to the procedure described in Example 3 except that the amount of $NH_4OH$ in solution A was varied to change to $NH_4OH$/Ni molar ratio when the two solutions were mixed. Decomposition was effected as described in Example 5. The catalysts so prepared are shown in Table 4 along with their catalytic activities for DBT measured as described in Example 5.

TABLE 4

Variation in $NH_4OH$ Addition to Preparation

| Catalyst $NH_4OH$/Ni mole ratio | Sample | ammonium molybdate (g) | ammonium metatungstate (g) | nickel nitrate hexahydrate (g) | $cm^3$ conc $NH_4OH$ | $K_{total}$ @ 350° C. | $K_{CHB/BP}$ @ 350° C. |
|---|---|---|---|---|---|---|---|
| 1:2 | 19086-96 | 17.65 | 24.6 | 43.65 | 6.8 | 102 | 10.5 |
| 1:1 | 19086-97 | 17.65 | 24.6 | 58.2 | 14 | 137 | 10.4 |
| 2:1 | 19086-82 | 17.65 | 24.6 | 72.75 | 30 | 167 | 12.4 |
| 3:1 | 19086-104 | 17.65 | 24.6 | 87.3 | 41 | 164 | 11.4 |
| 4:1 | 19086-106 | 17.65 | 24.6 | 87.3 | 55 | 161 | 12.1 |

While decomposition of the precursor compound will drive off most, if not all, of the ammonium portion of the precursor, the preparation of the precursor and the catalytic utility of the decomposition product can be affected by the amount of $NH_4OH$ employed. Thus, the effectiveness of the decomposition product as a catalyst is enhanced when the $NH_4OH$/Ni ratio in the preparation of the precursor compound is from about 1:1 to about 4:1, preferably about 1.5:1 to about 4:1, and more preferably about 2:1 to about 4:1. While not wishing to be bound by any particular theory or mechanism, there is some evidence the $NH_4OH$/Ni ratio causes the Ni—M—W—O phase to change in the decomposition product.

EXAMPLE 9

The catalysts of examples 1 and 2 were compared against standard supported Ni—Mo catalysts for the conversion of a LSADO (low sulfur auto diesel oil feed). This feed contained 510 wppm sulfur, 50 wppm nitrogen, and 30.6% aromatics with a gravity of 39.8° API. The catalysts were tested at 579° F., 650 psig of $H_2$, and 1850 SCFB/B of $H_2$. The relative activities of the different catalysts are summarized in Table 5.

TABLE 5

Relative Hydrotreating Activities on LSADO feed

| Catalyst | Relative Volumetric HDS Activity | Relative Volumetric HDN Activity |
|---|---|---|
| Ni, MO/$Al_2O_3$ | 1 | 1 |
| $NH_4$—NiMo—O | 0.25 | 0.50 |
| $NH_4$—$Ni_{1.0}Mo_{.5}W_{.5}$—O | 1.4 | 2.05 |

The Ni, Mo/$Al_2O_3$ catalyst is a standard HDN/HDS catalyst, the $NH_4$—Ni—Mo phase is the bulk phase with no tungsten, and the $NH_4$—$Ni_{1.0}Mo_{0.5}W_{0.5}$—O is the bulk phase with partial substitution of W for Mo. The NH—NiMo—O catalyst is also representative of known compounds. The catalyst of this invention is illustrated by $NH_4$—$Ni_{1.0}Mo_{0.5}W_{0.5}$—O and the data show the clear advantage of ammonium nickel tungsten molybdate for HDN activity.

We claim:

1. A catalytic hydrodenitrogenation process comprising contacting a hydrocarbon containing feed containing nitrogen in the presence of hydrogen and a catalyst comprising mixed metal oxide having the formula $$(Ni)_b(MO)_c(W)_dO_z$$

wherein the molar ratio of b:(c+d) is 0.5/1 to 3/1; the molar ratio of c:d is $\geq 0.001/1$; and z=[2b+6(c+d)]2.

2. The process of claim 1 wherein the x-ray diffraction pattern of the catalyst is essentially amorphous and has crystaline peaks at d=2.53 Angstoms and d=1.70 Angstroms.

3. The process of claim 1 wherein the molar ration of b:(c+d) is 0.75/1 to 1.5/1, and the molar ratio of c:d is 1/10 to 10/1.

4. The process of claim 1 wherein the hydrocarbon containing feed contains at least about 500 ppm total nitrogen compounds.

5. The process in claim 1 wherein the mixed metal oxide is sulfided.

* * * * *